B. WOLHAUPTER.

WELDED RAIL ANCHOR.

Reissued Oct. 25, 1921.

APPLICATION FILED AUG. 15, 1921.

15,215.

2 SHEETS—SHEET 1.

Inventor

B. Wolhaupter,

WITNESSES:—

Chas. L. Grigsbauer

Emory Dzroff

By

Attorney

B. WOLHAUPTER.

WELDED RAIL ANCHOR.

Reissued Oct. 25, 1921.

APPLICATION FILED AUG. 15, 1921.

15.215.

2 SHEETS—SHEET 2.

Inventor

B. Wolhaupter,

WITNESSES:-

Chas. L. Grieebauer

Emory L. Groff

By. [signature]

Attorney

UNITED STATES PATENT OFFICE.

BENJAMIN WOLHAUPTER, OF NEW ROCHELLE, NEW YORK.

WELDED RAIL-ANCHOR.

15,215. Specification of Reissued Letters Patent. Reissued Oct. 25, 1921.

Original No. 1,359,854, dated November 23, 1920, Serial No. 404,427, filed August 18, 1920. Reissue No. 15,131, dated June 21, 1921, Serial No. 466,595, filed May 3, 1921. This application for reissue filed August 15, 1921. Serial No. 492,320½.

*To all whom it may concern:*

Be it known that I, BENJAMIN WOLHAUPTER, a citizen of the United States, residing at New Rochelle, Westchester county, State of New York, have invented certain new and useful Improvements in Welded Rail-Anchors; and I do hereby declare the following to be a full, clear, and exact description of the invention, such as will enable others skilled in the art to which it appertains to make and use the same.

This invention relates to rail anchors of the type which are welded directly to the rail and are adapted to engage an abutment provided either by the tie or tie plate to check or prevent longitudinal creeping of the rails.

Primarily, the invention has for its object the provision of a rail anchor which may be cheaply made and applied, while at the same time possessing the capability of meeting all of the practical requirements for a rail anchor and embodying the desirable feature of having the adaptability of being readily and quickly detached or removed from the rail by a blow of a railroad spike maul or equivalent tool.

Another object of practical importance is to provide a rail anchor which may be constructed from simple sections or pieces of rolled steel in common use thereby entirely obviating the expense, time and labor incident to the processes of molding, casting, bending or rolling which are commonly employed in the manufacture of devices of this kind. To these ends the invention has for its general object the construction of a rail anchor of extreme simplicity and utilizing a minimum amount and weight of metal, and yet having the anchor in such form and arrangement as to permt it to be securely fastened to the rail by simple welds, sufficiently strong in the aggregate to effectually resist the creeping thrust of the rail while so disposed as to permit the anchor to be displaced or stripped from the rail by a hammer blow.

With these and further objects in view which will be apparent to those familiar with the art the invention consists in the novel features of improvement hereinafter more fully described, illustrated and claimed.

Though susceptible of structural modification certain preferred and practical embodiments of the device are shown in the accompanying drawings in which:—

Like references designate corresponding parts throughout the several figures of the drawings.

Figure 1:
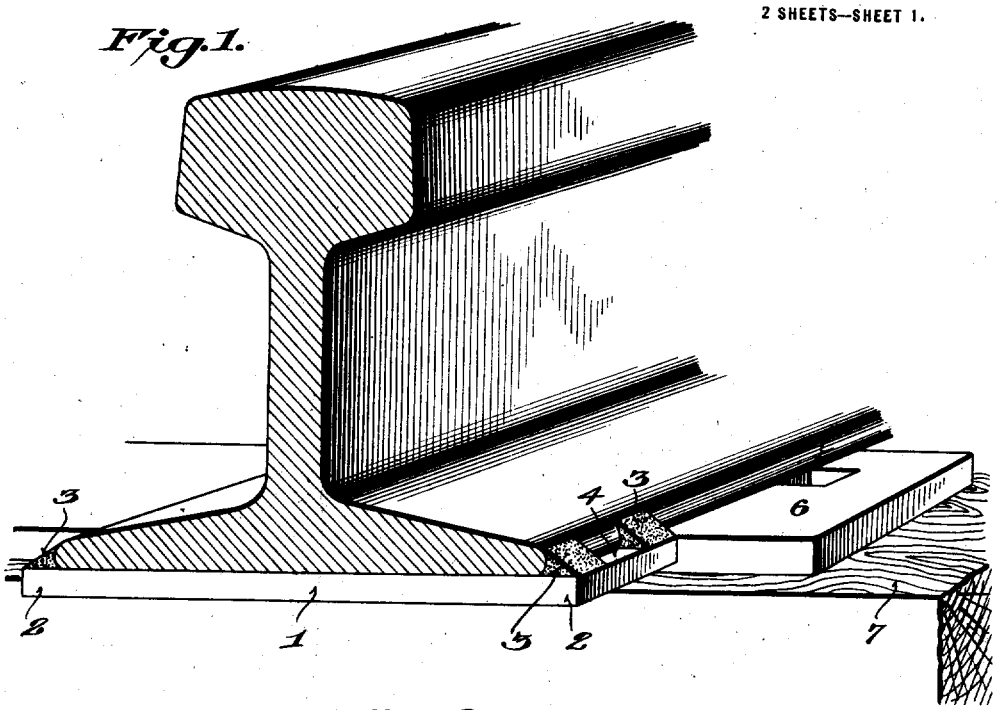
Figure 1 is a perspective view of a primary form of the rail anchor in its applied position on the rail base.
Figure 2:
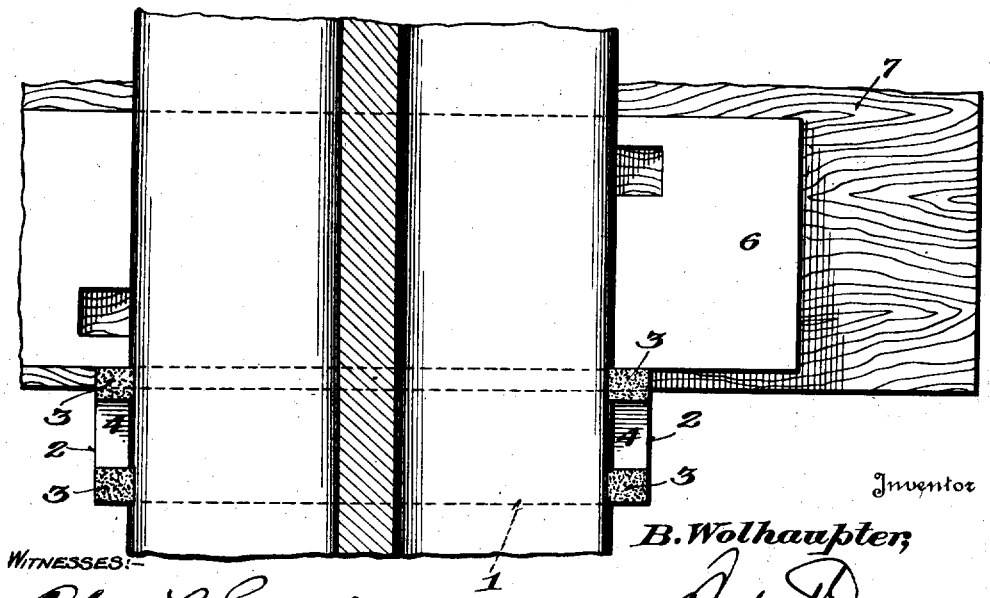
Fig. 2 is a sectional plan view of the structure shown in Fig. 1.
Figure 3:
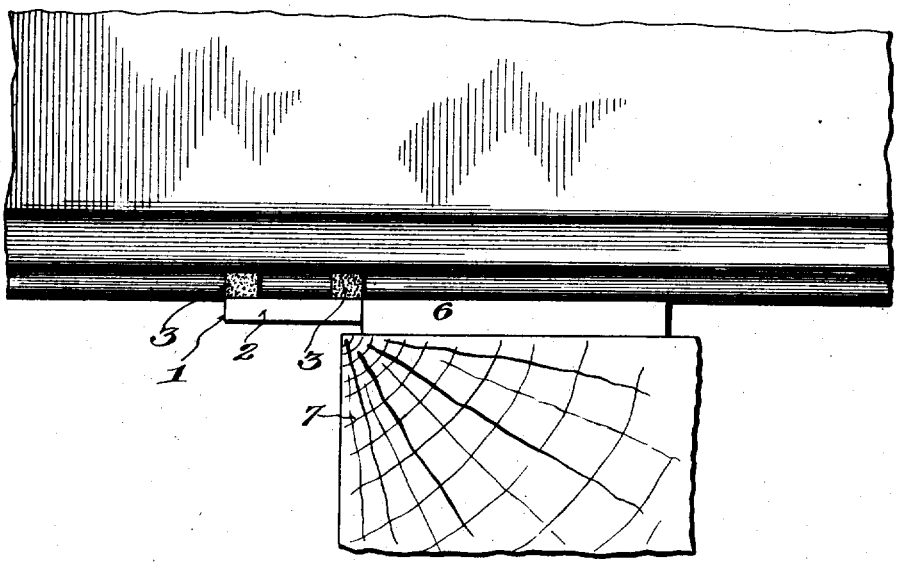
Fig. 3 is a side view of the rail showing the anchor applied in the manner shown in Fig. 1.

As above indicated the primary feature of this invention resides in the use of a simple form of anchoring member which may be termed a check bar designated by the numeral 1 and adapted to be arranged beneath the rail base and to extend transversely across the same. This check bar preferably consists of a suitable length of an ordinary section of rolled steel in common use, and as shown may be a simple flat bar which is placed beneath and against the rail base and which is slightly longer than the width of the rail base so as to have projecting end portions 2 constituting fastening lips secured to the adjacent edges of the rail flange by means of welds 3.

The projecting end portions 2 of the check bar 1 combine with the adjacent edges of the rail flange to provide well defined welding grooves or corners 4 in which the welds 3 are built up. These welds may be formed in any suitable manner but preferably by the oxyacetylene torch method and employment of the steel welding pencil or rod which builds up a separate body of metal between the two parts to be united, although it will be understood that I do not limit my invention to such method or any particular means of producing the welds 3 which rigidly and securely fasten the check bar to the rail flanges.

It will be further observed in connection with the welds 3 that at each projecting end 2 of the bar these welds are preferably spaced apart, and on the exposed part of the bar end 2 between the welds 3 a hammer blow may be directed to disengage and strip the anchor from the rail without injury thereto whenever it is necessary to remove the anchor in the resetting or reusing of the rail. While the individual welds 3 permit of this function of readily removing the anchor from the rail, it will be understood that the several welds in the aggregate are sufficiently strong to effectually resist the creeping force of the rail.

Figure 4:
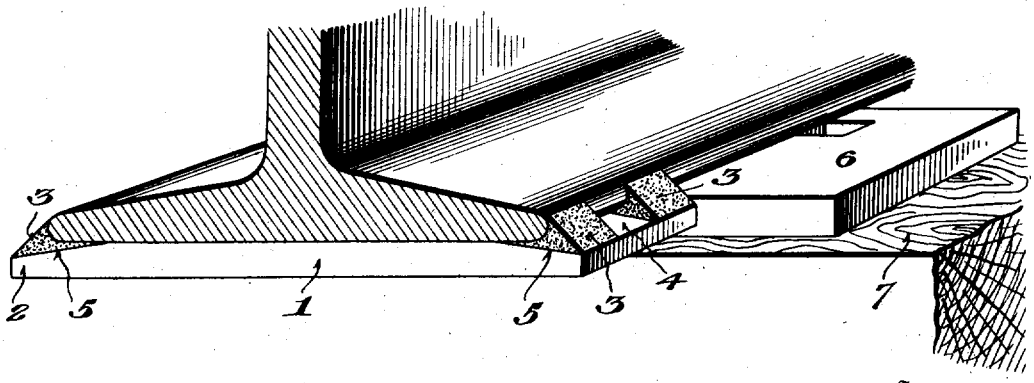
Fig. 4 is a view similar to Fig. 1 illustrating a modification that may be resorted to in order to obtain a strong weld at each welding point.

In the modified form of the invention suggested in Fig. 4 the upper surfaces of the projecting ends or lips 2 of the check bar may be downwardly and outwardly beveled as indicated at 5 thus permitting the metal of the welds 3 extending between the underside of the rail flanges and the upper side of the check bar thereby more securely fastening the bar to the rail flange at each welding location.

In its preferred use the check bar 4 is adapted to engage against the abutment provided by the tie plate 6 and the tie 7, but it will of course be understood that my invention is not limited to the abutment provided by the tie plate as the check bar may be made of material sufficiently deep so that it will engage the tie as the abutment surface.

From the foregoing it is thought that the construction, action and many advantages of the herein described rail anchor will be readily apparent without further description and it will be understood that various changes in the form, proportion and minor details of the construction may be resorted to without departing from the spirit or sacrificing any of the advantages of the invention.

I claim:

1. A rail anchor consisting of a bar extending across the rail base and welded to the edges of the rail flanges.

2. A rail anchor consisting of a bar extending across the rail base and having projecting ends welded to the edges of the rail flanges.

3. A rail anchor consisting of a bar extending across the rail base and having ends projecting beyond the edges of the rail flanges and welded connections between said projecting ends and the edges of the rail flanges.

4. A rail anchor consisting of a single bar extending across the rail base and welded at its ends to the edges of the rail flanges.

5. A rail anchor consisting of a single flat bar extending across the rail base and welded at its ends to the edges of the rail flanges.

6. A rail anchor consisting of a bar extending across the rail base and having a plurality of welded connections between its ends and the edges of the rail flanges.

7. A rail anchor consisting of a single flat bar extending across the rail base and having spaced welded connections between its ends and the edges of the rail flanges.

8. A rail anchor consisting of a bar extending across the rail base, and welded connections extending between the under and outer edges of the rail flanges and the under portions of said bar.

9. A rail anchor consisting of a bar extending across the rail base and provided with projecting beveled end portions, and welds between the beveled portions of the bar and the outer edge and under surfaces of the rail flanges.

10. A rail anchor consisting of a body part extending across the rail base and welded to both flanges.

11. A rail anchor consisting of a body part extending across the rail base and welded to the edges of both flanges.

12. A rail anchor consisting of a body part extending across the rail base and fillet welded to the edges of both flanges.

13. In a rail anchor, the combination with the rail and a suitable abutment, of a body extending across the rail base and welded to the edges of the rail flanges of the said body having a portion for engagement with said abutment.

In testimony whereof I hereunto affix my signature in the presence of two witnesses.

BENJAMIN WOLHAUPTER.

Witnesses:

LILLIAN LEINER,

ANDREW ARNOLD, Jr.